(12) United States Patent
Gritters et al.

(10) Patent No.: US 6,230,387 B1
(45) Date of Patent: May 15, 2001

(54) OPTICAL FIBER TERMINATION TOOL

(75) Inventors: Randy Gritters, New Lenox; Samuel Marrs, Bradley, both of IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 09/175,747

(22) Filed: Oct. 20, 1998

Related U.S. Application Data
(60) Provisional application No. 60/062,916, filed on Oct. 21, 1997.

(51) Int. Cl.[7] ............................. H01R 43/042; B21D 7/06
(52) U.S. Cl. ............................................. 29/566.4; 29/751
(58) Field of Search .................................. 29/564.4, 751, 29/566.1, 566.4; 72/410, 416; 81/9.44

(56) References Cited

U.S. PATENT DOCUMENTS

| | | |
|---|---|---|
| 4,429,451 | 2/1984 | Angelico . |
| 4,480,374 | 11/1984 | Meyer . |
| 4,625,386 | 12/1986 | Bieganski . |
| 4,713,874 | 12/1987 | Schwartz . |
| 4,787,144 | 11/1988 | Krampe . |
| 4,794,780 * | 1/1989 | Battenfeld ........................ 29/751 X |
| 4,981,032 | 1/1991 | Chen . |
| 5,003,846 | 4/1991 | Yagawa . |
| 5,109,591 | 5/1992 | Hung . |
| 5,113,674 * | 5/1992 | Slaney et al. ................. 29/751 VYR |
| 5,195,352 * | 3/1993 | Grois et al. ............................ 29/751 |
| 5,377,564 | 1/1995 | Erlich . |
| 5,442,724 | 8/1995 | Deuel . |

FOREIGN PATENT DOCUMENTS 11-38268 * 2/1999 (JP) ........................................ 29/751

\* cited by examiner

*Primary Examiner*—William Briggs
(74) *Attorney, Agent, or Firm*—Robert A. McCann

(57) ABSTRACT

A tool for field terminating optical fibers has an optical fiber cable preparation area for cutting and stripping the optical fiber cables and includes a fiber optic plug termination area and a fiber optic jack termination area.

9 Claims, 6 Drawing Sheets

OPTICAL FIBER TERMINATION TOOL

This application claims the benefit of U.S. Provisional Application No. 60/062,916 filed Oct. 21, 1997.

TECHNICAL FIELD

The present invention relates to a tool for field terminating an optical fiber connector and more particularly to an optical fiber termination tool which cuts and strips fiber optic cables and terminates the cables to either a fiber optic plug or a fiber optic jack connector.

BACKGROUND OF THE INVENTION

A variety of tools are known in the art of modular electrical connectors for assisting in the field termination of electric wires to modular connectors. Tools are known which allow the user to cut and strip the wires and terminate them to a plug or jack secured by the tool frame. The precise alignment of the electrical wires within the modular plug or jack is not critical, it is only necessary that proper electrical contact is made between the wires and the contacts of the electrical connector. With the increasing use of fiber optic connectors, it is becoming more important to have fiber optic connectors and tools which allow for field termination. However, with fiber optics precise alignment of the mating ends of fiber optic plugs and connectors is critical and requires tools which will very accurately align and terminate the fiber optic cables within the respective fiber optic connector.

SUMMARY OF THE INVENTION

It is therefore an object of the present invention to provide an improved fiber optic termination tool.

It is another object of the invention to provide a fiber optic termination tool with an improved fiber optic cable alignment.

In general, a termination tool in accordance with the present invention includes a pair of handles pivotally connected and movable from an open to a closed position, wherein the pair of handles cooperate to form a fiber optic plug termination area, a fiber optic jack termination area and a fiber optic cable preparation area. Additionally, the plug termination area and the jack termination area having plug and jack housing openings respectively and each opening including a cantilevered spring board extending from an abutment side of the respective housing opening and each of the spring boards includes a cam surface latch adapted for mating with a corresponding cam surface recess formed on the plug and jack housings respectively.

DESCRIPTION OF THE PREFERRED EMBODIMENT

Figure 1:
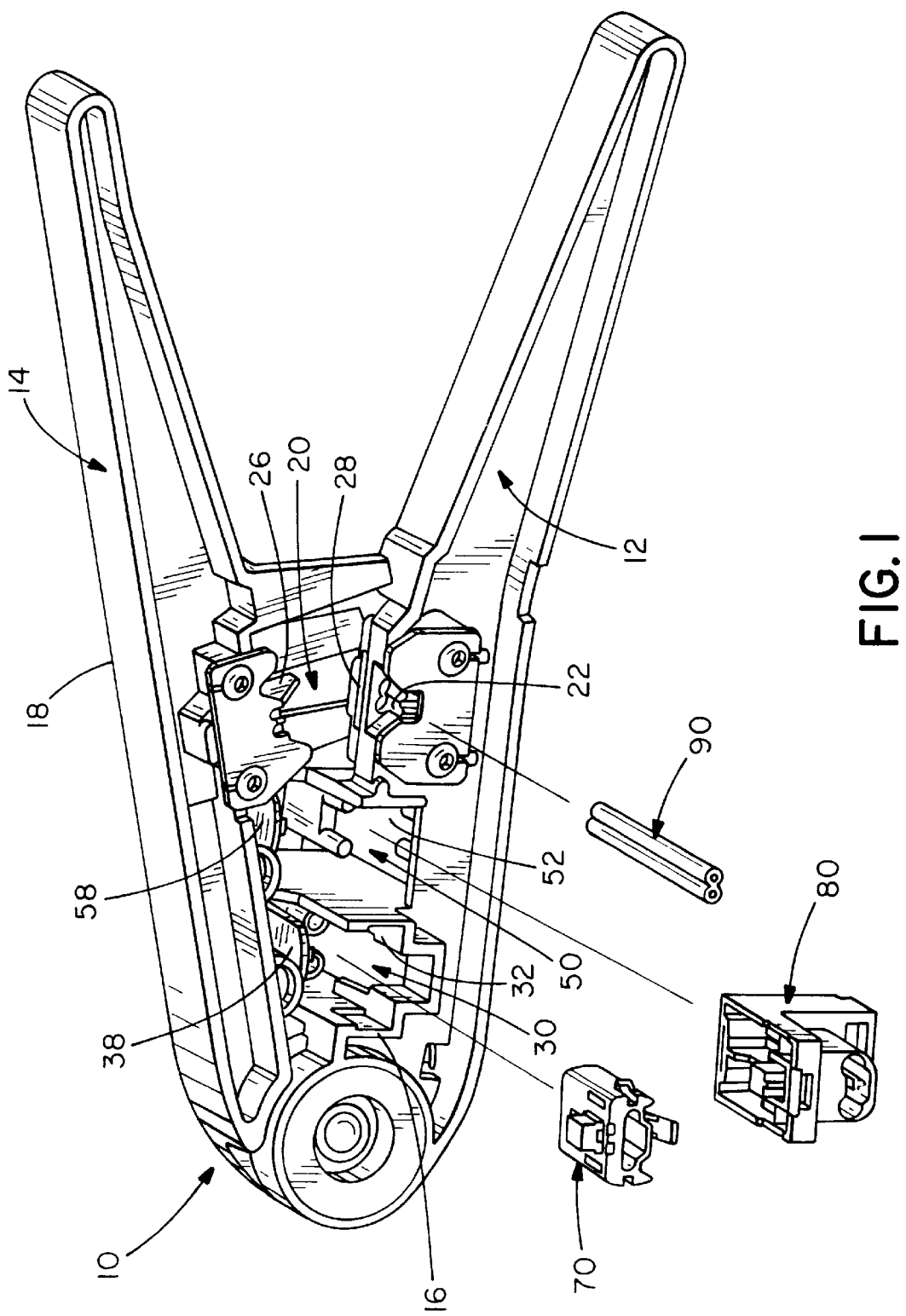
FIG. 1 is a perspective view of the insertion side of the termination tool of the present invention.

A fiber optic termination tool embodying the concept of the present invention is designated generally by the reference numeral 10 in the accompanying drawings. The termination tool 10 includes lower 12 and upper 14 pivotally connected handles. The lower and upper handles 12, 14 are spring biased apart and cooperate to form the working area of the tool 10 that includes a plug termination area 30 and a jack termination area 50. Tool 10 is also provided with an optical fiber cut and strip area 20. The handles 12, 14 have an insertion side 16 from which the plug, jack or cables are inserted during operation and an abutment side 18 at which the plug, jack or cables are abutted against during termination.

Figure 2:
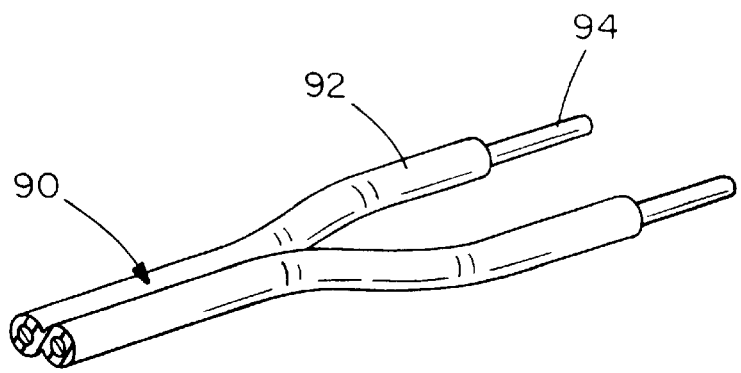
FIG. 2 is a sectional view of the stripped and cut optical fibers to be terminated.
Figure 6:
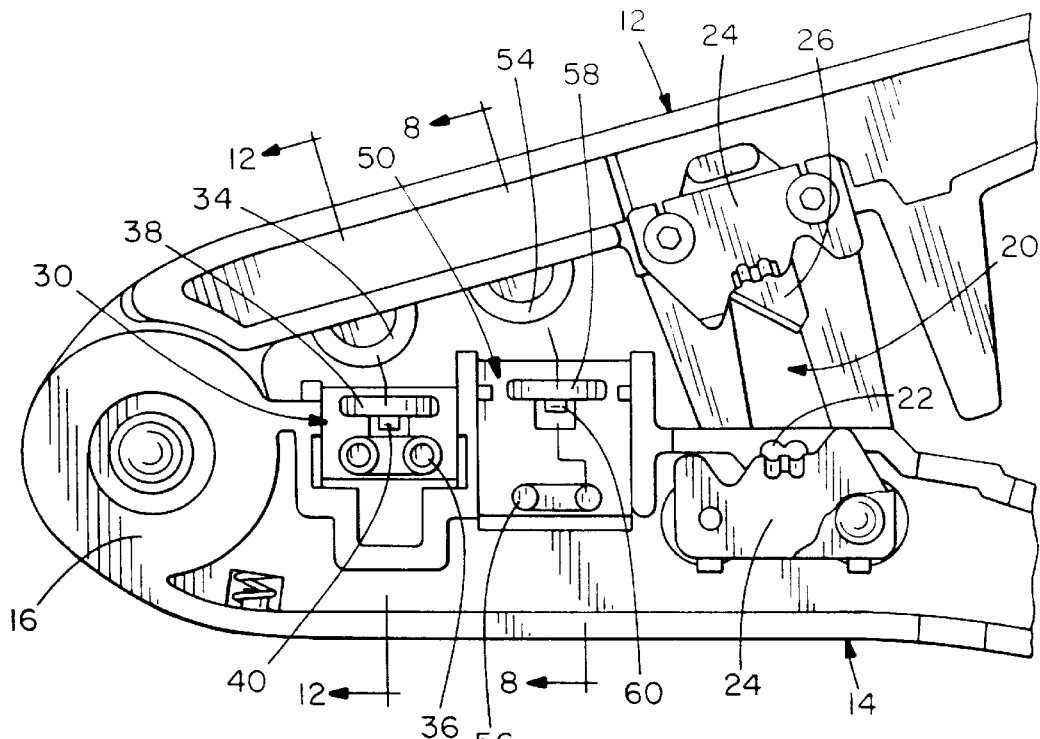
FIG. 6 is a sectional view of the tool of FIG. 1.
Figure 7:
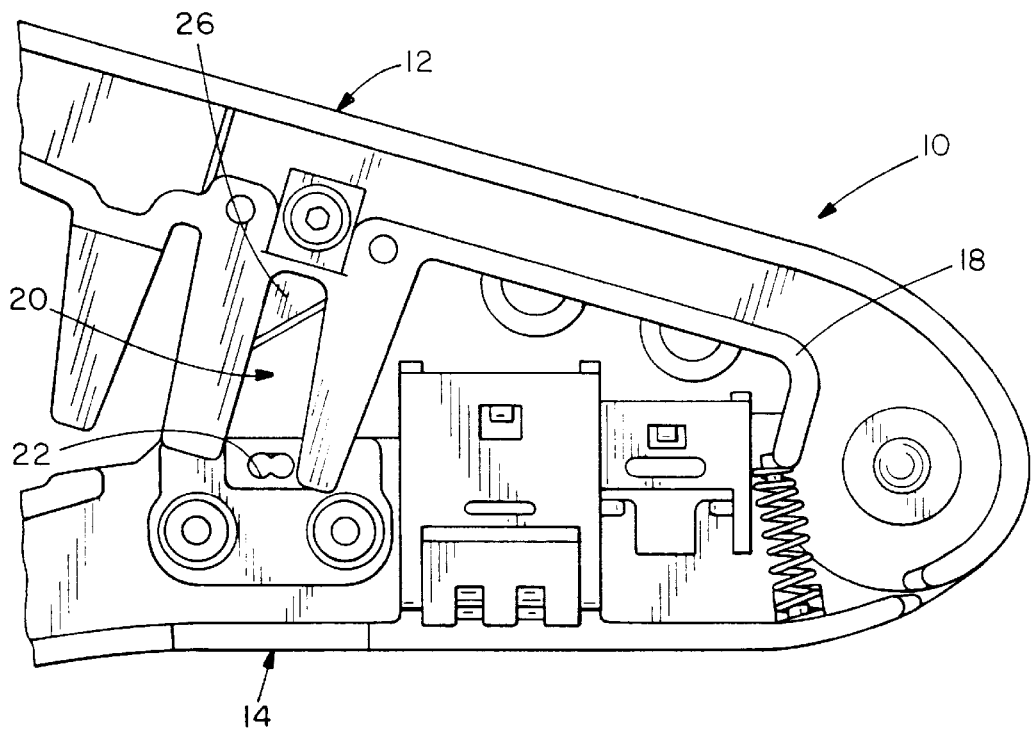
FIG. 7 is a sectional view of the tool of FIG. 5.
Figure 8:
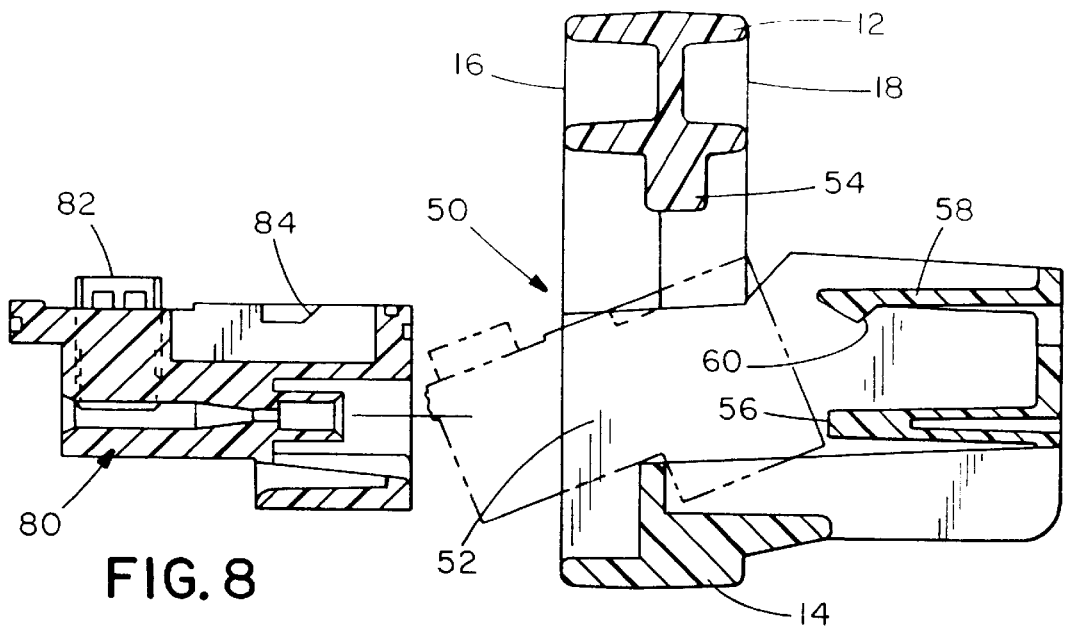
FIG. 8 is a cross sectional view of a jack and the tool taken along lines 8—8 of FIG. 6.
Figure 9:
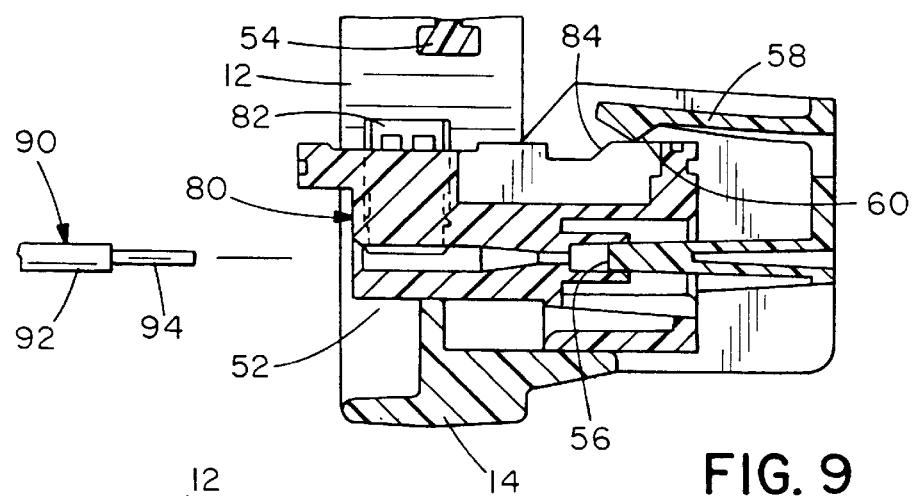
FIG. 9 is a cross sectional view of the jack being inserted into position in the tool.
Figures 10, 11:
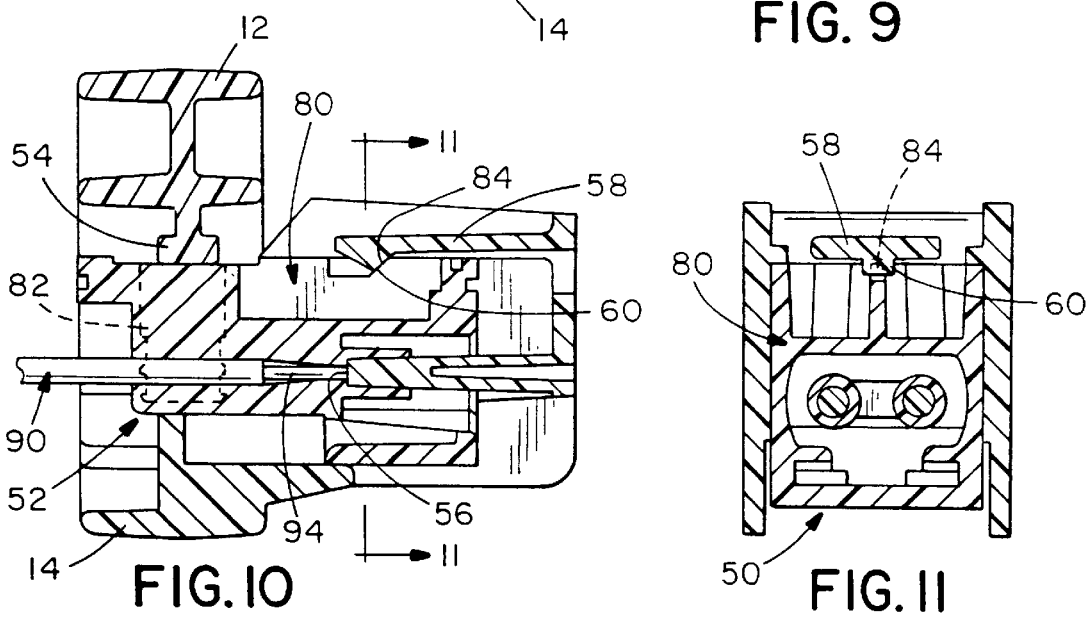
FIG. 10 is a cross sectional view of the jack being terminated.
FIG. 11 is a rear sectional view taken along lines 11—11 of FIG. 10.
Figure 12:
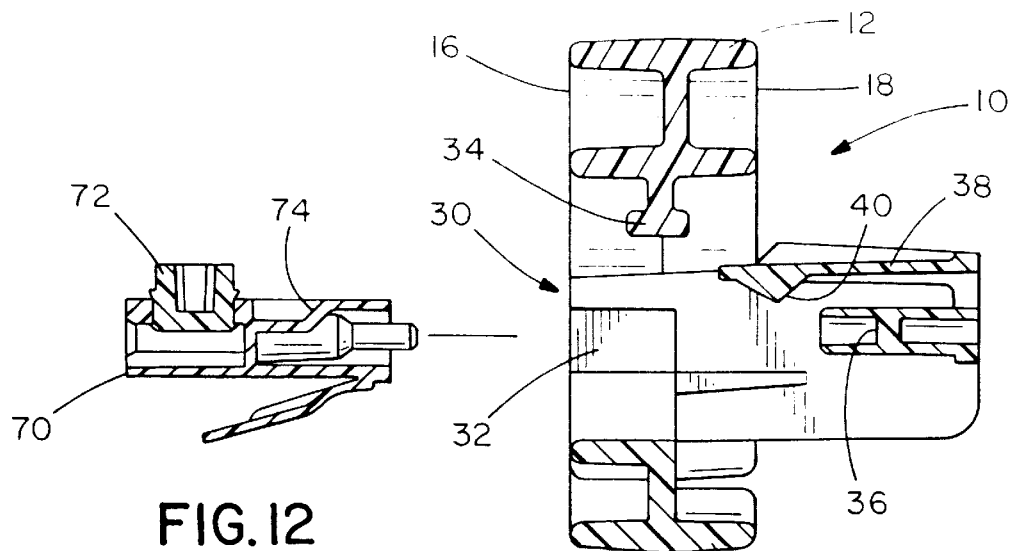
FIG. 12 is a cross sectional view of a plug and the tool taken along lines 12—12 of FIG. 6.
Figure 13:
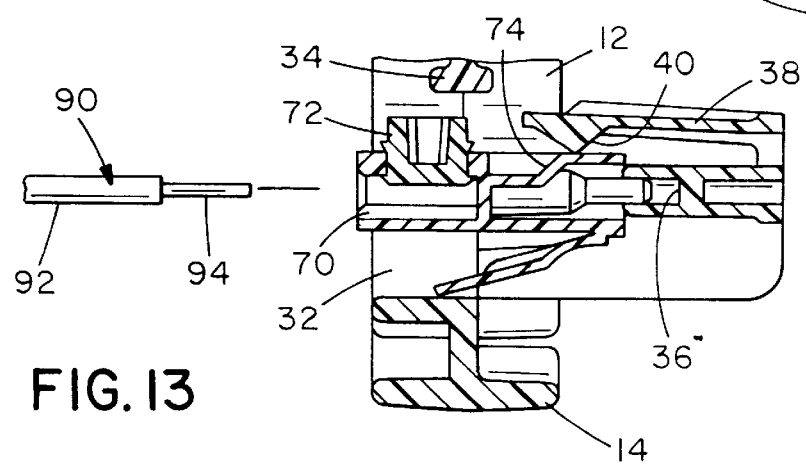
FIG. 13 is a cross sectional view of the plug being inserted into position in the tool.
Figure 14:
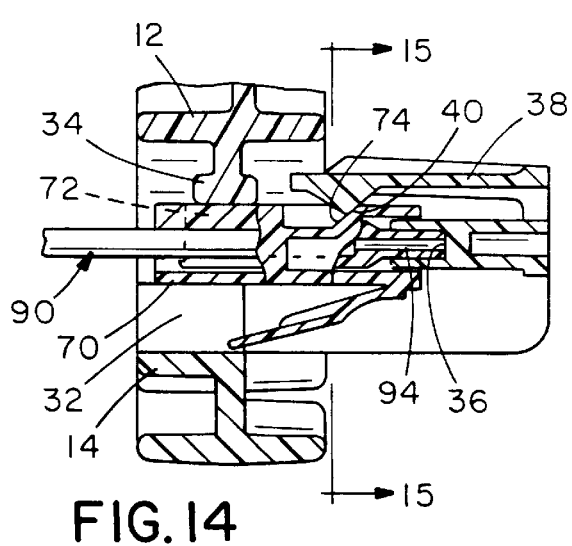
FIG. 14 is a cross sectional view of the plug being terminated.
Figure 15:
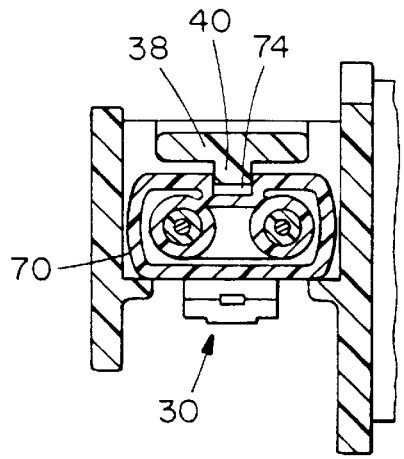
FIG. 15 is a rear sectional view taken along lines 15—15 of FIG. 14.

As best seen in FIGS. 1 and 6, the cut and strip area 20 includes a trough-like shelf that acts as a fiber optic cable guide 22 and a pair of opposing wire stripping blades 24 situated on an insertion side 16 of each handle and contoured to strip the fiber optic cable 90 without cutting it when the handles 12, 14 are brought together. There is also provided a cutting blade 26 extending downward from an abutment side 18 of the upper handle 14 at a spaced distance from stripping blade 24. The cutting blade 26 cleanly cuts the end of the plastic fiber 90 and is passes into a corresponding slot 28 formed on lower handle 12 when the handles are brought together. The fiber optic cables 90 are generally provided in side-by-side pairs which can be split apart after the cut and strip operation to provide two prepared fiber optic cable ends for termination as shown in FIG. 2.

Figure 3:
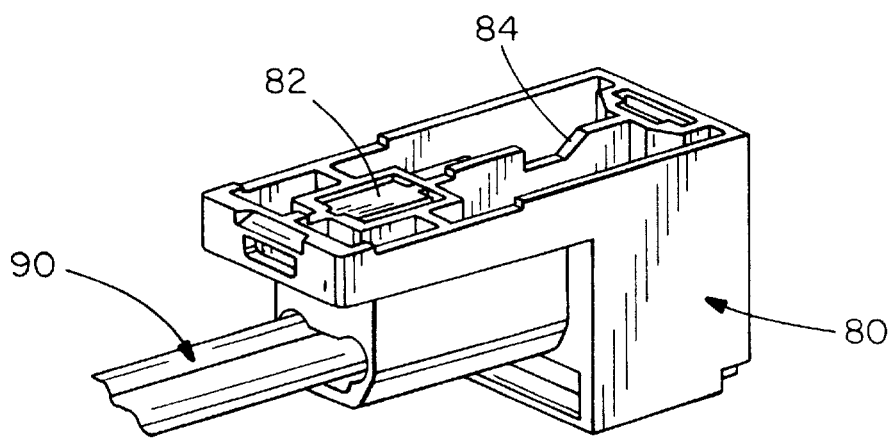
FIG. 3 is a rear perspective view of the underside of a terminated jack.
Figure 4:
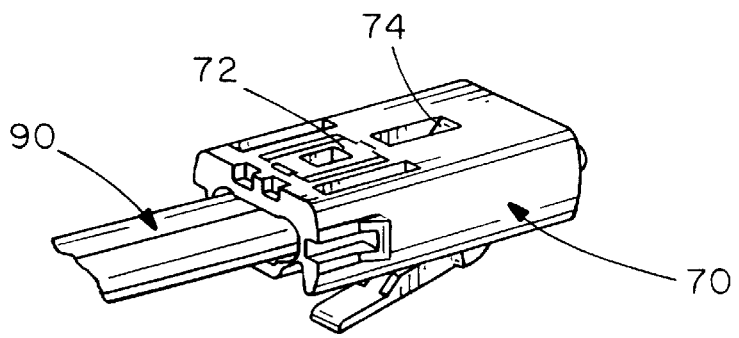
FIG. 4 is a rear perspective view of the underside of a terminated plug.
Figure 5:
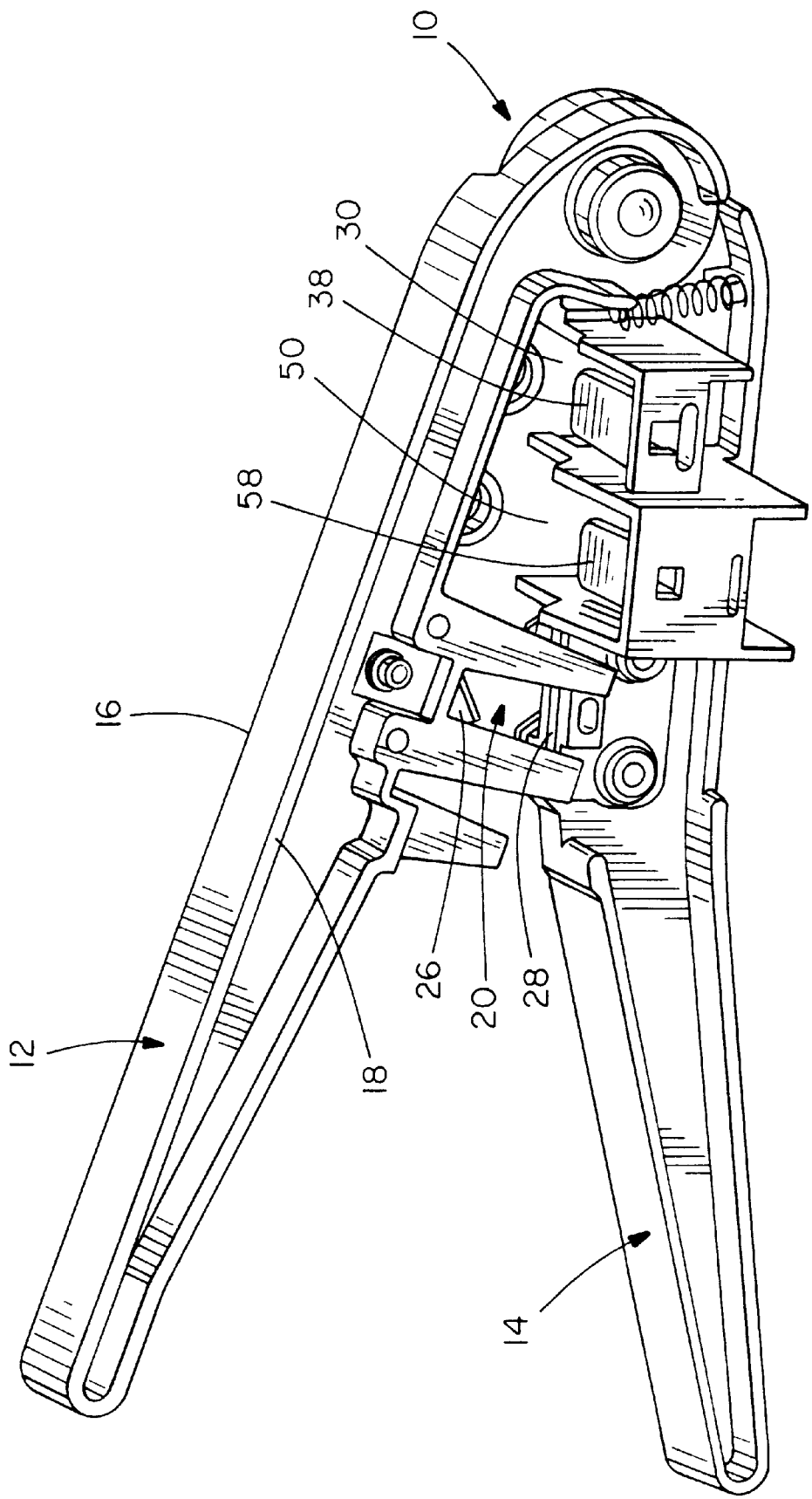
FIG. 5 is a perspective view of the back side of the tool of the present invention.

As best seen in FIGS. 1 and 6, the plug and jack terminating areas 30, 50 each comprise plug and jack housing openings 32, 52, respectively disposed on the lower handle 12 as well as corresponding insert rams 34, 54 disposed on the upper handle 14 such that when a plug 70 or jack 80 is situated within the respective opening 32, 52, upon closing the handles 12, 14, the respective insert ram 34, 54 forces a corresponding locking insert 72, 82 into the opening of the plug 70 or jack 80 for securing the fiber optic cables thereto as shown in FIGS. 3 and 4. Both the plug and jack housing openings 32, 52 include fiber stops 36, 56 which provide surfaces for the plastic fiber end 90 to abut against. As shown in FIGS. 12–15 and 8–11 respectively, there is also provided in both the plug housing opening 32 and the jack housing opening 52, a spring board 38, 58 formed as a cantilever beam extending from the abutment side 18 of the housing opening 32, 52 toward the rear of the inserted plug or jack 70, 80. The spring boards 38, 58 include a cam surface latch 40, 60 which mates with a corresponding cam recess surface 74, 84 on the plug 70 and jack 80 respectively so as to bias each forward thus securely holding each connector in proper alignment during termination. The forward bias force of the springboard 38, 58 insures that the plug and jack respectively are fully inserted within their respective housing openings 32, 52 such that the inserted fibers 94 abutting the fiber stops 36, 56 are dimensioned precisely such that after termination when the terminated plug is connected to the terminated jack the fiber end faces are in proper mating relationship.

While the particular embodiment of the present invention has been shown and described, it will be obvious to those skilled in the art that changes and modifications may be made without departing from the invention and its broader aspects. The matter set forth in the foregoing description and accompanying drawings is offered by way of illustration only and not as a limitation.

What is claimed is:

1. A tool for terminating optical fiber cables, comprising:
    a pair of handles cooperatively engaged and movable from an open position to a closed position wherein the pair of handles cooperate to form a fiber optic plug termination area having a plug housing opening and a cantilevered spring board extending from an abutment side of the plug housing opening.

2. A tool for terminating optical fiber cables, comprising:
    a pair of handles pivotally connected and movable from an open to a closed position, wherein the pair of handles cooperate to form a fiber optic plug termination area, a fiber optic jack termination area and a fiber optic cable preparation area, wherein the plug termination area and the jack termination area have plug and jack housing openings respectively and each opening includes a cantilevered spring board extending from an abutment side of the respective housing opening.

3. A tool according to claim 2 wherein each of the spring boards includes a cam surface latch adapted for mating with a corresponding cam surface recess formed on the plug and jack housings respectively.

4. A tool according to claim 2 wherein the fiber optic cable preparation area includes a fiber optic cable stripping blade and a cutting blade.

5. A tool for terminating optical fiber cables, comprising:
    a pair of handles cooperatively engaged and movable from an open position to a closed position wherein the pair of handles cooperate to form a fiber optic jack termination area having a jack housing opening and a cantilevered spring board extending from an abutment side of the jack housing opening.

6. A tool according to claim 5 wherein each of the spring boards includes a cam surface latch adapted for mating with a corresponding cam surface recess formed on the plug and jack housings respectively.

7. A tool according to claim 6 wherein the fiber optic cable preparation area contain a fiber optic cable stripping blade and a cutting blade.

8. A tool according to claim 1 wherein each of the spring boards includes a cam surface latch adapted for mating with a corresponding cam surface recess formed on the plug and jack housings respectively.

9. A tool according to claim 8 wherein the fiber optic cable preparation area contain a fiber optic cable stripping blade and a cutting blade.

* * * * *